March 29, 1932.  G. H. STONER  1,851,737
BRAKE
Filed Dec. 23, 1929  2 Sheets-Sheet 1

INVENTOR:
George H. Stoner
By Macleod, Calver, Copeland & Dike
Attys.

March 29, 1932. G. H. STONER 1,851,737
BRAKE
Filed Dec. 23, 1929 2 Sheets-Sheet 2

INVENTOR:
George H. Stoner
By Macleod, Calver, Copeland & Dike
Attys.

Patented Mar. 29, 1932

1,851,737

UNITED STATES PATENT OFFICE

GEORGE H. STONER, OF BOSTON, MASSACHUSETTS, ASSIGNOR TO STONER-AMES BRAKE COMPANY, INC., OF BOSTON, MASSACHUSETTS, A CORPORATION OF MASSACHUSETTS

BRAKE

Application filed December 23, 1929. Serial No. 415,902.

This invention relates to vehicle brakes of the internal expanding type and particularly of the general type in which the brake shoe is provided with a deformable contact member which may be positively adjusted to conform accurately to the curvature of the brake drum.

It is an object of the invention to provide a brake capable of giving a smooth powerful braking action by a very light force upon the brake operating pedal.

Another object is the provision of an operating mechanism which is capable of transmitting substantially the entire force applied thereto to the brake shoe thus increasing the efficiency of the brake.

It is also another object to provide an improved mounting for supporting the brake shoes.

Another object is the provision in conjunction with the improved operating mechanism of means for maintaining a predetermined relation between the brake shoes and a given diameter of the brake drum while adjusting the curvature of the brake shoes.

The invention will be more clearly understood from the following description in conjunction with the accompanying drawings; in which, Fig. 1 is a side elevation, partly in section, of a vehicle brake embodying the invention, the parts being shown in the relative positions they assume before the brake is expanded.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the claim hereto appended as considered in view of the prior art and the requirements thereof.

Figure 1:
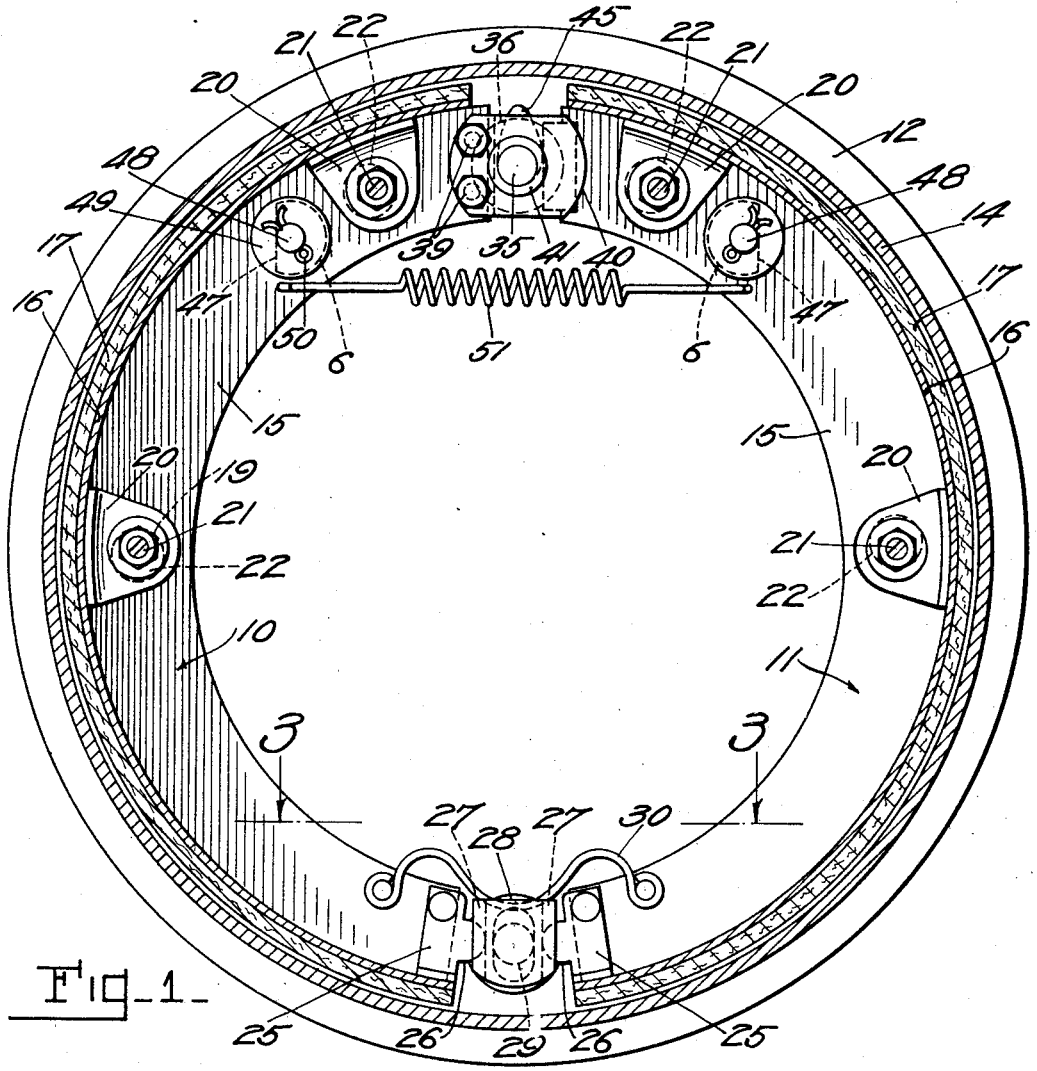
Figure 2:
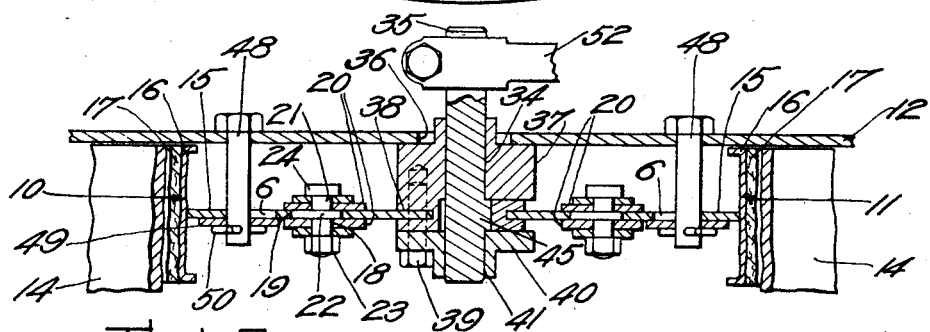
Fig. 2 is a top plan view partly in section.
Figure 3:
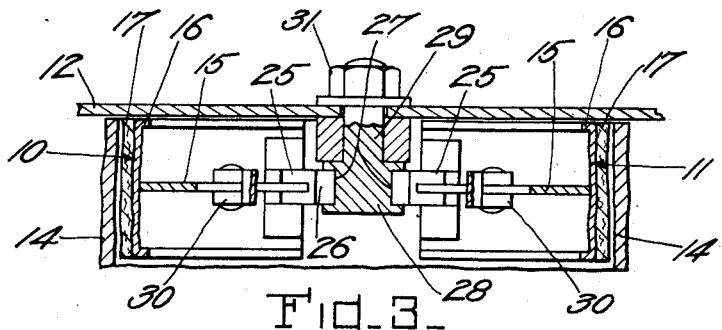
Fig. 3 is a sectional view taken substantially on the line 3—3 of Fig. 1, certain of the parts being broken away to more clearly illustrate the construction.
Figure 4:
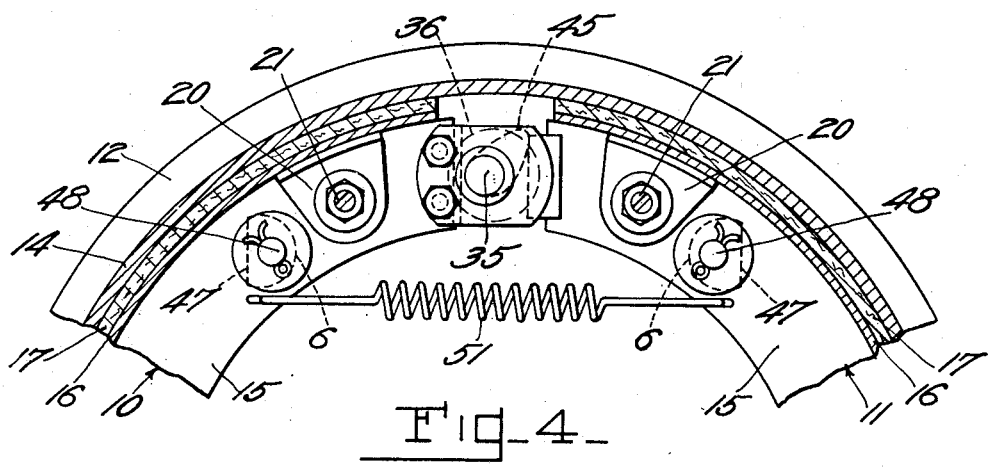
Fig. 4 is a fragmentary view, similar to Fig. 1, showing the relative position of the parts after the brake is expanded.
Figure 5:
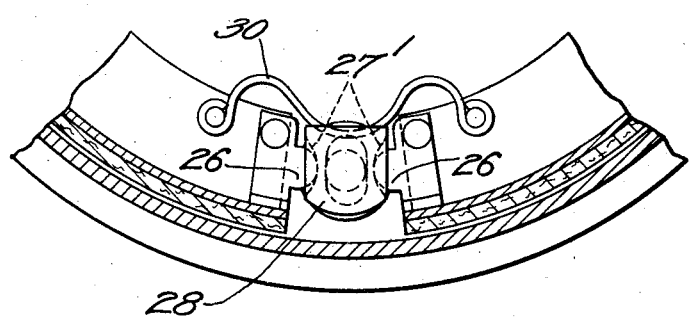
Fig. 5 is a modified construction.

One embodiment of the invention is illustrated in the accompanying drawings which show a brake comprising a brake shoe composed of sections 10 and 11 suitably mounted upon a fixed backing plate 12 so as to be moved into and out of engagement with a brake drum 14 rotatable with the vehicle wheel. The brake shoes 10 and 11 each comprise a substantially non-deformable member 15 and a deformable contact member 16 carrying a suitable friction material, such as a brake lining 17. The members 15 and 16 are joined together by suitably spaced connections each comprising a pair of spaced brackets 20 fixed to the member 16 and enclosing the member 15. Each of the brackets 20 is provided with an opening 18 serving as a bearing for an eccentric shaft 21 carrying an eccentric 22 engaging a circular opening 19 in the member 15. Each shaft 21 is provided with a head 24 adapted to engage one of the brackets 20 and is locked against rotation by a suitable clamp, such as a nut 23, engaging the opposite bracket 20. The members 15 and 16 of each brake shoe are secured together at one end by a suitable bracket 25 having a projection 26 provided with a curved end adapted to be received in a groove 27 in the edge of a block 28 mounted upon an anchor pin 29 which is adjustably mounted upon the backing plate 12, as by a nut 31 on the pin 29 engaging the plate 12. The grooves for receiving the projections 26 may be curved as shown at 27¹ in the modified construction shown in Fig. 5. A spring 30 is secured at its ends to each of the members 15 with its intermediate portion in engagement with the block 28 so as to tend to move each of the shoes 10 and 11 inward with respect to the block.

Suitable mechanism is provided for expanding the shoes 10 and 11 against the surface of the drum 14. In the form illustrated, this mechanism comprises a cam shaft 35 which passes freely through a relatively large opening 36 in the backing plate 12 and is supported solely by one of the brake shoes.

For this purpose the free end of one of the members 15 is positioned in a groove 38 in a block 37 having a bearing 34 for rotatably supporting the shaft 35. The block 37 is secured to the member 15 by bolts 39 which also serve to secure a cap 40 to the block 37. The cap 40 also embraces the free end of the other member 15 and holds it in sliding engagement between the block 37 and the cap 40. The outer end of the shaft 35 is rotatably supported in a bearing 41 in the cap 40. A cam 45 is carried by the shaft 35 and is positioned thereon between the block 37 and cap 40 so as to engage the free end of the member 15 slidable between the cap and block. The shaft 35 is connected to the brake pedal of the vehicle by the usual mechanism including a lever 52 clamped on the shaft 35.

Each of the members 15 is arranged with an opening 6 providing a surface 47 on each member 15 substantially parallel to a diameter of the drum 14 passing through the shaft 35 and the anchor pin 29 and substantially equidistant therefrom when the brake shoes are in retracted position. Bolts 48 are secured to the backing plate 12 so that one passes through each of the openings 6 and each carries a washer 49 held in engagement with the outer surface of the member 15, as by a cotter pin 50. A spring 51 connects the members 15 and normally holds the brake shoes 10 and 11 in retracted position away from the drum 14 a distance limited by engagement of the surfaces 47 with the stop bolts 48.

In operation the brake shoes 10 and 11 are expanded against the drum 14 by depressing the brake pedal (not shown) of the vehicle causing rotation of the shaft 35 and consequent outward movement of the shoes 10 and 11. It will be noted that during the expansion of the brake shoes 10 and 11, the shaft 35 moves with the brake shoe 10 and the other brake shoe 11 is engaged by the cam 45. Thus, both the force applied to the brake pedal of the vehicle and its reaction are transmitted and absorbed in the operation and expansion of the brake shoe thereby utilizing efficiently substantially the entire force applied to operate the brake. As the shoes 10 and 11 are expanded the projections 26 slide outwardly in the grooves 27 formed in the block 28 to bring the lower ends of the shoes 10 and 11 in engagement with the drum 14. When the force applied to operate the brake has been released, the spring 51 moves the shoes 10 and 11 inward to bring the surfaces 47 against the stop bolts 48 and at the same time the spring 30 moves the lower ends of the shoes inward along the grooves 27 thus bringing the contact members 16 away from the drum.

It will be apparent that upon continued operation of the brake to stop a vehicle, the lining 17 carried by the deformable contact members 16 will become worn and as a result the curvature of its outer surface will not conform accurately to the curvature of the drum. Under such conditions one or more of the shafts 21 which carry the eccentrics 22 are unlocked and turned to move the deformable members 16 outwardly until their curvature again corresponds to that of the drum. The shaft 21 is then locked against rotation and the brake is ready for further operation. In the course of this adjustment it will be noted that the spring 51 maintains the surfaces 47 in engagement with the stop bolts 48 thereby maintaining their predetermined symmetrical relation to a given diameter of the drum through the shaft 35 and anchor pin 29.

I claim:

In an internal expanding brake, a brake drum, a backing plate, a pair of brake shoes, means for slidably and pivotally connecting adjacent ends of said shoes to the backing plate comprising a block adapted to be adjustably fixed on the backing plate and having grooves progressively increasing in depth from their opposite ends toward an intermediate point to receive the adjacent ends of said shoes, and a spring connected at its ends to said adjacent ends of the shoes and having a portion bearing on said block.

In testimony whereof I affix my signature.

GEORGE H. STONER.